United States Patent [19]

Sharp

[11] 4,451,376
[45] May 29, 1984

[54] MULTI-FUNCTIONAL HYPOBROMIDE PRECURSORS

[75] Inventor: John D. Sharp, Brookfield, Ill.

[73] Assignee: Nalco Chemical Company, Oak Brook, Ill.

[21] Appl. No.: 518,181

[22] Filed: Jul. 28, 1983

[51] Int. Cl.$^3$ ............................................. C02F 1/50
[52] U.S. Cl. ................................. 210/701; 210/754; 210/756; 210/764; 422/37; 162/161; 252/181
[58] Field of Search ............... 210/754, 755, 756, 764, 210/698, 701; 162/161, 190; 252/86, 87, 180, 181; 422/37

[56] References Cited

U.S. PATENT DOCUMENTS

| 2,443,429 | 6/1948 | Marks | 210/754 |
| 2,662,855 | 12/1953 | Kamlet | 210/754 |
| 2,729,557 | 1/1956 | Booth | 210/701 |
| 2,815,311 | 12/1957 | Ellis | 210/754 |
| 3,152,073 | 10/1964 | Morton | 210/754 |
| 3,975,271 | 8/1976 | Saunier | 210/754 |
| 4,008,614 | 2/1977 | Watson | 210/698 |
| 4,029,577 | 6/1977 | Godlewski | 210/701 |
| 4,072,607 | 2/1978 | Schiller | 210/701 |
| 4,087,360 | 5/1978 | Faust | 210/764 |
| 4,126,549 | 11/1978 | Jones | 210/701 |

FOREIGN PATENT DOCUMENTS

| 208256 | 5/1957 | Australia | 210/701 |
| 281867 | 6/1962 | Australia | 210/698 |
| 614685 | 2/1961 | Canada | 210/701 |
| 55-84597 | 6/1980 | Japan | 210/701 |
| 781730 | 2/1955 | United Kingdom | 210/754 |
| 772775 | 4/1957 | United Kingdom | 210/701 |
| 2026517 | 2/1980 | United Kingdom | 210/701 |

OTHER PUBLICATIONS

"Bromine and its Compounds," Z. E. Jolles, ed. Academic Press, N.Y.–London, 1966, pp. 556–562.
"Handbook of Chlorination," White, Van Nostrand Reinhold Co., New York, NY, 1972, pp. 708–710.

Primary Examiner—Ernest G. Therkorn
Attorney, Agent, or Firm—John G. Premo; Robert A. Miller; Donald G. Epple

[57] ABSTRACT

An improved method for treating alkaline industrial process waters to control the growth and deposit of microorganisms which comprises adding to such waters a combination of a water-soluble anionic polymeric dispersant having a molecular weight not greater than 50,000 and hypobromous acid, said hypobromous acid having been produced by contacting a solution containing:

(a) a water-soluble inorganic bromide, and
(b) an anionic polymeric dispersant with a chlorine containing oxidant chosen from the group consisting of an inorganic hypochlorite salt, hypochlorous acid, and chlorine.

3 Claims, No Drawings

MULTI-FUNCTIONAL HYPOBROMIDE PRECURSORS

INTRODUCTION

Many industrial process waters are contaminated with microorganisms, particularly bacteria. Such industrial process water systems include waters used in the manufacture of paper, cooling tower waters, and the like. Where large quantities of microorganisms are found such as in paper mills, they tend to accumulate and cause troublesome deposits which interfere in the operation of the industrial process using such contaminated waters.

It is customary to treat such biologically contaminated industrial waters with one or more microbiocides in an attempt to control the microorganism content of such waters. In addition to using microbiocides, it has become common to employ in such systems along with microbiocides water-soluble polymeric dispersants which prevent buildup of microbiological deposits by preventing inorganic deposits on which microbiological deposits accumulate, thus keeping industrial process water systems relatively clean.

One of the most common microbiocides used to treat large scale industrial process water systems is chlorine or sodium hypochlorite.

It is now known that a very potent biocide for treating industrial process water systems is hypobromous acid (HOBr) which is conveniently made by reacting a bromide salt with a water-soluble hypochlorite such as sodium hypochlorite or $Cl_2$. As will be shown hereafter, it is not efficient to prepare hypobromous acid directly in a biologically contaminated industrial process water system with a high chlorine demand such as a paper mill. Even though these systems can contain some free hypochlorite or hypochlorous acid, the conversion of, for instance, bromide ion to hypobromous acid is poor. To be an effective biocide utilized in industrial process water systems, it is necessary that the hypobromous acid or its corresponding alkali metal hypobromite salt be produced as a treating solution which is then added to the industrial water supply which contains the unwanted microorganisms.

From the above, it is obvious that if it is sought to use sodium hypobromite or hypobromous acid, it must be pre-prepared and then subsequently added to a biologically contaminated industrial process water system. If it is desired to use it in combination with a polymeric dispersant, it is necessary to provide to the ultimate user of these products three separate ingredients in order to prepare the combination of the polymeric dispersant with the hypobromous acid or sodium hypobromite. These three products are, of course, the polymeric dispersant, a solution of sodium hypochlorite, hypochlorous acid or $Cl_2$, and a water-soluble bromide salt.

The present invention is directed to an improved method for treating alkaline industrial process water systems contaminated with microorganisms with a combination of a dispersant and hypobromous acid which, when provided to these systems in accordance with the invention, surprisingly produces a synergistic result in relation to the control of microorganisms and the dispersion of potential deposit-forming substances.

THE INVENTION

An improved method for treating alkaline industrial process waters to control the growth and deposit of microorganisms which comprises adding to such waters a combination of a water-soluble anionic polymeric dispersant having a molecular weight not greater than 50,000 and hypobromous acid, said hypobromous acid having been produced by contacting a solution containing:

(a) a water-soluble inorganic bromide, and
(b) an anionic polymeric dispersant with a chlorine containing oxidant from the group consisting of inorganic hypochlorite salts, hypochlorous acid and chlorine.

The Anionic Water-Soluble Polymeric Dispersants

These polymeric materials are preferably water-soluble vinyl polymers. They may be either homo or copolymers and must contain some anionic characteristics. The anionic characteristic is provided by carboxylate functionality which may be either in the form of the free acid or its salt. Other anionic groups are sulphonic acid and sulfonate groups.

These polymers, to be effective as dispersants, should have molecular weights below 50,000 with a preferred molecular weight being 20,000 or less.

A wide variety of such polymers are known, are described in the patent and trade literature, and are available commercially.

A preferred polymeric dispersant of the type described above are the low molecular weight copolymers of acrylic acid and methyl or ethyl acrylate. The preferred polymers of this type contain molecular weights within the range of 3000–20,000 and, preferably, within the range of 6000–12,000.

A preferred polymer on a weight basis contains for each part by weight of ethyl or methyl acrylate about 6 parts by weight of acrylic acid or sodium acrylate. They are prepared using a molar excess of acrylic acid over the acrylate ester of at least 3:1 and, preferably, within the range 4:1 to 5:1. Polymers of this type and their method of preparation are set forth in U.S. Pat. No. 4,008,164, the disclosure of which is incorporated herein by reference.

Another group of polymers that provide good dispersant activity are the copolymers of maleic anhydride (free acid or salt form) and styrene, which are subsequently sulfonated. These polymers have a mole ratio of sulphonated styrene moieties to moieties derived from maleic anhydride from about 2:1 to about 4:1. Polymers of this type are described in U.S. Pat. No. 4,288,327, the disclosure of which is incorporated herein by reference.

Another useful group of polymers are polymers of styrene sulphonic acid with acrylic or methacrylic acid and their water-soluble salts. Copolymers of this type are described in U.S. Pat. No. 4,048,066, the disclosure of which is incorporated herein by reference. Still another type of low molecular weight polymers that may be used in the practice of the invention are those polymers of acrylic acid or acrylic acid in combination with acrylamide described in Booth, U.S. Pat. No. 3,463,730 and Ruhrwein, U.S. Pat. No. 2,980,610, the disclosures of which are incorporated herein by reference. Another group of useful polymers are copolymers of acrylic acid and sodium vinyl sulfonate. These polymers have a mole ratio of acrylic acid to sodium vinyl sulfonate of from 90:10 to 60:40.

The Hypobromous Acid Precursors

As indicated, in order to generate hypobromous acid, it is necessary to use as a starting material to generate these compounds a water-soluble bromide. While any water-soluble bromide can be used, the most desirable and useful in the practice of the invention are calcium, sodium, or potassium bromides.

To generate the desired hypobromous acid, it is necessary that the bromide salt be contacted with a water-soluble chlorine containing oxidant such as an hypochlorite salt, hypochlorous acid, or $Cl_2$.

This generation of the hypobromous acid as a treating solution for the biologically contaminated industrial process waters may be done in a separate mixing tank which contains solutions of the water-soluble chlorine containing oxidant. To this is added the bromide salt solution containing the dispersant polymer, thereby creating the activated hypobromous acid.

The above scheme without dispersant polymer would normally be followed prior to the invention since if sodium hypochlorite or $Cl_2$ is combined with a bromide salt in a mixing tank in an effort to produce HOBr, this HOBr is not stable at concentrated levels and decomposes to $Br_2$, bromate, and bromite.

If the hypochlorite or chlorine is combined with the anionic polymeric dispersant as a precursor solution, the oxidizing effects of the chlorine-containing materials deactivates the polymer and the concentration of hypochlorite or $Cl_2$ is severely reduced and thereby not available to react with the bromide salt.

Therefore, only the combination of this invention, i.e., the dispersant with bromide salt, which is then subsequently combined with the chlorine-containing oxidant, can adequately function to achieve microbiological control.

The unique feature of the invention resides in the discovery that combining an aqueous solution of the anionic water-soluble polymer with a water-soluble bromide salt to prepare a concentrate, which is fed to either a makeup tank or a split feed stream mixing arrangement of known design which contains sodium hypochlorite or chlorine, thereby converting the bromide salt to an effective biocidal form of hypobromous acid. This combination of biocidal hypobromous acid and dispersant polymer is then fed to the aqueous industrial process waters to be treated. This approach of feeding the combination of bromide salt and polymer produces active biocide and polymer with enhanced dispersant activity to provide a synergistic combination for microbiological deposit control.

The ratio of polymer to bromide salt may vary, but it is preferred to be within the range of 1:3 to 3:1.

The amount of hypobromous acid in the industrial water process system capable of controlling microbiological growth can be as little as 0.1 ppm up to about 3 ppm. A typical dosage would be 1 ppm.

The amount of polymer to achieve good dispersion of biological products of micro organisms and existing deposits can vary between about ¼ ppm up to as much as 50 ppm. A useful dosage is 2-5 ppm.

To illustrate the various advantages of the invention, the following data is presented in the way of Tables.

Table I. HOBr is a more active biocide at alkaline pH than either $ClO_2$ or HOCl. At a constant pH, the ratio of HOCl to $OCl^-$ will be the same whether you started with NaOCl or $Cl_2$. 1 ppm $Cl_2$ produces 0.74 ppm of $HOCl+OCl^-$ and 1 ppm NaOCl produces 0.70 ppm $HOCl+OCl^-$.

Table II. The dispersant when combined with bromide and reacted with NaOCl shows enhanced activity.

Table III. The biocidal effect of the presence or absence of bromide in a concentrated mixture of dispersant and NaOCl.

Table IV. The effect of bromide ion on the reaction of NaOCl and dispersant with respect to chlorine demand and HOBr yield.

Table V. The HOBr yield versus time of very dilute (typical application dosages) mixtures of bromide, dispersant, and NaOCl.

Table VI. Comparison of both dispersant and biocidal activity of various combinations of the actives.

GLOSSARY

| Comp. No. | Ingredients | |
|---|---|---|
| 1 | 15% $NaClO_2$ | |
| 2 | Concentrated HCl | |
| 3 | 5.25% NaOCl | |
| 4 | .16% NaOBr | |
| 5 | 53% $CaBr_2$ Solution | 10% by weight; |
|   | 24% Na acrylate- | |
|   | 4% Ethylacrylate | |
|   | (MW = 6000) | 15% by weight; |
|   | $H_2O$ | 75% by weight |
| 6 | 15% NaOCl | |
| 7 | Na acrylate- | 24% by weight; |
|   | Ethylacrylate | |
|   | copolymer (MW = 6000) | 4% by weight; |
|   | $H_2O$ | Balance |
| 8 | 14% NaOCl | |
| 9 | 48.6% of Composition 7 | |
|   | 24% of 45% NaBr | |
| 10 | NaOBr prepared in beaker from $CaBr_2$ | |
| 11 | 45% NaBr | |

TABLE I

Microbiological Control Data

| Treatments | Feed Rate (cc/min) | Contact Time | Slug ppm Active | Theoretical HoBr | $ClO_2$ | Generated NaOCl | Active Measured Residual | % Yield | Plate count Blank | Inlet | Outlet | % Reduction |
|---|---|---|---|---|---|---|---|---|---|---|---|---|
| Comp. 1 | .0122 | 1¼ hrs. | 5 | | 5 | | — | 100% | 90E5 | 79E3 | | 99.1 |
| 2 | .00225 | | ($ClO_2$) | | | | | Assumed | | | 44E3 | 99.5 |
| 1 | .00871 | 45 min. | 3.6 | | 3.6 | | — | 100% | 2.75E7 | 2.48E7 | | 10.0 |
| 2 | .00161 | | ($ClO_2$) | | | | | Assumed | | | 6.0E6 | 78.2 |
| 1 | .0122 | 1 hr. | 5 | | 5 | | — | 100% | 2.85E7 | neg/1000 | | 99.99 |
| 2 | .00225 | | $ClO_2$ | | | | | Assumed | | | neg/1000 | 99.99 |
| 1 | .0171 | 1 hr. | 7.1 | | 7.1 | | — | 100% | 3.2E7 | neg/1000 | | 99.99 |
| 2 | .00315 | | | | | | | Assumed | | | neg/1000 | 99.99 |
| 1 | .0122 | 1 hr. | 5.0 | | 5.0 | | — | 100% | 2AE7 | neg/1000 | | 99.99 |
| 2 | .00225 | | | | | | | Assumed | | | 1E3 | 99.99 |
| 1 | .0171 | 1 hr. | 7.1 | | 7.1 | | — | 100% | 2.72E7 | 1E3 | | 99.99 |
| 2 | .00315 | | | | | | | Assumed | | | neg/1000 | 99.99 |

TABLE I-continued

Microbiological Control Data

| Treatments | Feed Rate (cc/min) | Contact Time | Slug ppm Active | Theoretical HoBr | ClO$_2$ | Generated NaOCl | Active Measured Residual | % Yield | Plate count Blank | Plate count Inlet | Plate count Outlet | % Reduction |
|---|---|---|---|---|---|---|---|---|---|---|---|---|
| 1 | .0171 | 1 hr. | 7.1 | 7.1 | | | — | 100% Assumed | 5E7 | neg/1000 | 6E3 | 99.99 99.99 |
| 2 | .00315 | | | | | | | | | | | |
| 1 | .0240 | 4 hr. | 10.0 | 10.0 | | 10.0 | | 100% Yield | 1.4E7 | neg/1000 | neg/1000 | 99.9 99.99 |
| 2 | .00441 | | | | | | | | | | | |
| 3 | .0176 | 45 min. | 8 | | 8 | 8 | no reaction | | 3.2E7 | 5E3 | 137E3 | 99.99 99.6 |
| 4 | .444 | 1 hr. | 3 | 3 | | | 3 | no reaction | 2.8E7 | 3E3 | 12E3 | 99.99 99.99 |
| 4 | .871 | 2 hr. | 6 | 6 | | | 6 | no reaction | 5E7 | 6E3 | 10E3 | 99.99 99.99 |
| 10 | | | 3 | 3 | | | 3 | 100% yield overnight | 3.5E7 | 7E3 | 60E3 | 99.99 99.95 |
| 4 | | | 3 | 3 | | | 1.5 | 50% yield 10 min. | 2.4E7 | | 120E4 | 95.0 |
| 5 | .0109 | 1½ hrs. | 2.46 | 2.46 | | | 1.85 | 75% | 2.5E7 | 3E3 | 70E3 | 99.99 99.8 |
| 6 | .00643 | | ←NaOCl feed corrected for concentration, feed equipment modified | | | | | | | | | |
| 5 | .0153 | 2 hr. | 3.5 | 3.5 | | | 2.6 | 75% .7 ppm excess NaOCl | 2.8E7 | 165E5? | 10E3 | 99.95 99.99 |
| 6 | .00900 | | | | | | | | | | | |
| 5 | .0214 | 1½ hr. | 4.9 | 4.9 | | | 4.2 | 85% 1.8 ppm excess NaOCl | 3.2E7 | 1E3 | neg/1000 | 99.99 99.99 |
| 6 | .0126 | | | | | | | | | | | |
| 5 | .00778 | 1 hr. | 1.75 | 1.75 | | | 1.36 | 78% | 4E7 | 11E3 | 100E5 | 99.93 25 |
| 6 | .00459 | | | | | | | | | | | |
| 5 | .00778 | 2 hr. | 1.75 | 1.75 | | | 1.36 | 78% yield Assumed | 9E6 | neg/1000 | 10E3 | 99.99 99.9 |
| 6 | .00459 | | | | | | | | | | | |
| 5 | .0109 | | 2.46 | 2.46 | | | 1.85 | 75% yield Assumed | 9.5E6 | 2E3 | 90E3 | 99.95 99. |
| 6 | .00643 | | | | | | | | | | | |

TABLE II

Particulate Iron Dispersancy Test

| Components | Wt % | Run No. Dosage*** | % Transmittance** After 1 hr | % Transmittance** After 2 hr | Comments |
|---|---|---|---|---|---|
| Comp. 7 | 15.0 | #1 | 60.8 | 47.6 | Good activity |
| H$_2$O | 85.0 | #2 | 61.1 | 48.4 | Good activity |
| Comp. 5 | 66.7 | #1 | 61.7 | 50.4 | Good activity, |
| H$_2$O | 33.3 | #2 | 60.5 | 47.3 | Bromide doesn't affect activity |
| Comp. 5 | 66.7 | (2 hr contact time) #1 | 56.1 | 42.8 | Excellent activities |
| Comp. 6 | 33.3 | (24 hr contact time) #2 | 42.4 | 33.0 | Activity enhanced |
| Solution A* | | | | | |
| Bromide | 4.7 | #1 } averaged | 41.5 | 26.5 | Extremely active, Versa TL-3 standard yields 45–48% T |
| Dispersant | 27.0 | #2 | | | |
| NaOCl | 5.3 | | | | |
| Solution B* | | | | | |
| Dispersant | 27.0 | #1 } averaged | 53.3 | 41.9 | Good activity |
| NaOCl | 5.3 | #2 | | | |
| Solution C* | | | | | |
| Dispersant | 27.0 | #1 } averaged | 60.3 | 49.7 | Fair activity |
| NaOCl | 5.3 | #2 | | | |
| Bromide-post addition | 4.7 | | | | |
| Solution D* | | | | | |
| Dispersant | 27.0 | #1 } averaged | 44.8 | 32.1 | Very good activity |
| Bromide | 4.7 | #2 | | | |

Note:
Because of limitations in the screening test, results are not comparable between runs on different dates.
*Refer to Table IV for exact composition of appropriate solution
**The lower the % T the better the dispersant activity
***used is the amount of product needed to have dispersant concentration at 1 ppm in the active acid form

TABLE III

Bacterial Kill of Various Combinations of Bromide, NaOCl and Dispersant

| Sample No. | Base* Soln | Ml** Treatment Aliquat | ppm HOBr Assuming 100% Yield | Measured ppm HOBr | ppm NaOCl Assuming No Reaction | Actual ppm NaOCl | Total Count | % Kill |
|---|---|---|---|---|---|---|---|---|
| 0 | blank | 0 | 0 | 0 | 0 | 0 | 28E6 | 0 |
| 1 | A | 0.5 | 0.5 | 0.4 | 0.6 | 0.1 | 11E6 | 61 |
| 2 | A | 1.5 | 1.5 | 1.2 | 1.7 | 0.33 | 27E4 | 99.0 |
| 3 | A | 4.5 | 4.5 | 3.7 | 5.2 | 1 | 17E3 | 99.94 |
| 4 | B | 0.5 | 0 No Br⁻ present | 0 | 0.6 | 0.38 | 17E6 | 39 |
| 5 | B | 1.5 | 0 No Br⁻ present | 0 | 1.7 | 1.0 | 26E5 | 90.7 |
| 6 | B | 4.5 | 0 No Br⁻ present | 0 | 5.2 | 3.1 | 14E4 | 99.5 |
| 7 | C | 0.5 | 0.5 | .33 | 0.6 | 0 | 14E6 | 50 |
| 8 | C | 1.5 | 1.5 | 1.0 | 1.7 | 0 | 10E6 | 64 |
| 9 | C | 4.5 | 4.5 | 3.0 | 5.2 | 0 | 59E4 | 97.9 |
| 10 | D | 0.5 | .5 No NaOCl added | 0 | 0 | 0 | 28E6 | 0 |
| 11 | D | 1.5 | 1.5 | 0 | 0 | 0 | 24E6 | 14 |
| 12 | D | 4.5 | 4.5 | 0 | 0 | 0 | 32E6 | −14 |
| 13 | E | 0.5 | 0 No Br⁻ present | 0 | 0.60 | 0.46 | 21E6 | 25 |
| 14 | E | 1.5 | 0 No Br⁻ present | 0 | 1.7 | 1.4 | 9E5 | 96.8 |
| 15 | E | 4.5 | 0 No Br⁻ present | 0 | 5.2 | 4.2 | 13E4 | 99.5 |

*Refer to Table IV for composition of base solutions
**Treatment aliquat is from sample prepared from 1.78 grams of base stock diluted to 1.00 liters
***pH of testing 7.0, the difference in % kill between HOBr and NaOCl would increase with increasing pH

TABLE IV

Effect of Bromide on the Oxidation of Comp. 7 by NaOCl

| Soln | Initial NaOCl* Conc % | Final NaOCl* Conc % (2 hrs) | Final HOBr* Conc % | % Loss of NaOCl due to HOBr Formation | % Unreacted NaOCl | % Loss of NaOCl due to Oxidation of Dispersant | Br⁻ (gms) | Comp. 7 (gms) | NaOCl (gms) | H₂O + Inerts (gms) |
|---|---|---|---|---|---|---|---|---|---|---|
| A | 4.05 | 1 | 3.7 | 69 | 25 | 6.1 | 0.64 | 3.7 | 0.72 | 8.5 |
| B | 4.05 | 3.0 | 0 | 0 | 74 | 26 | 0 | 3.7 | 0.72 | 9.1 |
| C | 4.05 | 0 | 3.0 | 57 | 0 | 43 | 0.64 added 1¼ hrs after start of reaction | 3.7 | 0.72 | 8.5 |
| D | 0 | 0 | 0 | 0 | 0 | 0 | 0.64 | 3.7 | 0 | 9.2 |
| E | 4.05 | 4.05 | 0 | 0 | 100 | 0 | 0.0 | 0.0 | 0.72 | 13.0 |

*As determined by LaMotte titration

TABLE V

HOBr Yield vs. Time at Dilute Concentration

Comp. 8  Analyzed at 14.2₅ NaOCl
Comp. 9  48.6% Comp. 7 (26.2% acid polymer dispersant)
         24.1% Comp. 11 (45% NaBr)
Dilution water  tap water Procedure: A stream (10 ml/min) of Comp. 9 was combined with 8 ml/min of Comp. 8 and immediately diluted by pumping the combined materials into a water stream flowing at 5 gpm. A sample was pulled immediately after the diluted materials had passed through a mixing column of less than 30 seconds retention time. Part of the sample was diluted 20:1 and titrated immediately to determine total oxidant (HOCl ClO₂ OCl⁻ HOBr by LaMotte method) Another part was immediately reacted with glycine solution for HOBr determination. Original sample was allowed to set and was sampled after 5 minutes and 10 minutes. Same analyses were completed on those samples.

| Contact Time (min) | HOCl Conc ppm | Theoretical HOBr Yield (ppm) | Actual ppm HOBr | % Yield |
|---|---|---|---|---|
| 1 (Sample A) | 58 | 52 | 2.7 | 5 |
| 1 (Sample B) | 42 | 52 | 2.7 | 5 |
| 5 (Sample A) | 42 | 52 | 5.4 | 10 |
| 5 (Sample B) | 34 | 52 | 16 | 31 |
| 10 (Sample B) | 14 | 52 | 54 | 104 |

TABLE VI

Comparison of Different Combinations of Br⁻, Dispersant and NaOCl on Both Biocide and Dispersant

| Combination | % Kill** | Dispersant + Activity*** |
|---|---|---|
| Bromide → , Dispersant → , NaOCl → | Soln A Table IV (2 hrs) → | Best % Kill | best activity |
| NaOCl → , Dispersant → | Soln B Table IV (2 hrs) → | 3rd best activity | worst activity |
| NaOCl → , Dispersant → (1½ hrs), Bromide → (½ hr) | | 2nd worst activity | 2nd worst activity |
| Dispersant → , Bromide → | | no activity | 2nd best activity |
| NaOCl → , H₂O → | | 2nd best activity | no activity |

\*Refer to Table IV for exact combination weights
\*\*% Kill total count plates. Table III.
\*\*\*Particulate iron dispersancy test refer to attached procedure and Table II

I claim:

1. An improved method for treating alkaline industrial process waters to control the growth and deposit of microorganisms which comprises adding to such waters a combination of a water-soluble anionic polymeric dispersant having a molecular weight not greater than 50,000 and hypobromous acid, said hypobromous acid having been produced by contacting a solution containing both:
   (a) a water-soluble inorganic bromide, and
   (b) an anionic polymeric dispersant
with a second solution of a chlorine containing oxidant chosen from the group consisting of an inorganic hypochlorite salt, hypochlorous acid, and chlorine.

2. The improved method of claim 1 where the molecular weight of the anionic polymeric dispersant is less than 20,000 and the inorganic hypochlorite salt is sodium hypochlorite.

3. The improved method of claim 2 where the anionic polymeric dispersant is a copolymer of sodium acrylate and ethylacrylate.

* * * * *